United States Patent [19]

Salerno et al.

[11] 4,385,025
[45] May 24, 1983

[54] METHOD OF COINJECTION MOLDING OF THERMOPLASTIC AND THERMOPLASTIC ELASTOMER

[75] Inventors: Charles M. Salerno, Wayland; Harold V. Hamilton, Bedford; Dale W. Schubert, Sudbury, all of Mass.

[73] Assignee: Barry Wright Corporation, Newton Lower Falls, Mass.

[21] Appl. No.: 198,792

[22] Filed: Oct. 20, 1980

Related U.S. Application Data

[63] Continuation-in-part of Ser. No. 86,733, Oct. 22, 1979, abandoned.

[51] Int. Cl.³ .............................................. B29H 3/08
[52] U.S. Cl. ................................ 264/255; 264/328.7; 264/262; 425/112
[58] Field of Search ............ 264/255, 328.7, DIG. 67, 264/245, 294, 262; 425/DIG. 5, 112; 249/82

[56] References Cited

U.S. PATENT DOCUMENTS 3,485,911  12/1969  Reyburn .............................. 264/255
3,608,049   9/1971  Tavella ............................... 264/262

FOREIGN PATENT DOCUMENTS 2558406   8/1976  Fed. Rep. of Germany ...... 264/255
2397280   3/1979  France ................................. 264/255
 840041   7/1960  United Kingdom ................ 264/255
1456258  11/1976  United Kingdom ................ 248/632

OTHER PUBLICATIONS

*Application Selection Guide*, Bulletin CS-178, Barry Wright Corp., 1978.

*Primary Examiner*—James B. Lowe
*Attorney, Agent, or Firm*—Milton E. Gilbert; Gary E. Ross

[57] ABSTRACT

Vibration isolators are manufactured by a co-injection molding process. Outer and inner parts of the isolators are molded first from a rigid or stiff thermoplastic material such as polystyrene and intermediate spring-like parts of the isolators are made of a thermoplastic elastomer such as copolymer of butadiene and styrene formed and bonded to the outer and inner parts in a subsequent molding step.

14 Claims, 6 Drawing Figures

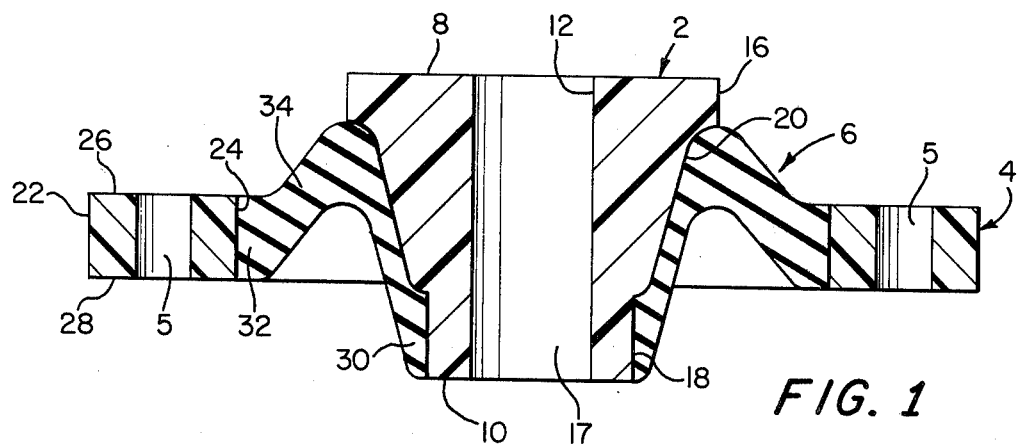
FIG. 1
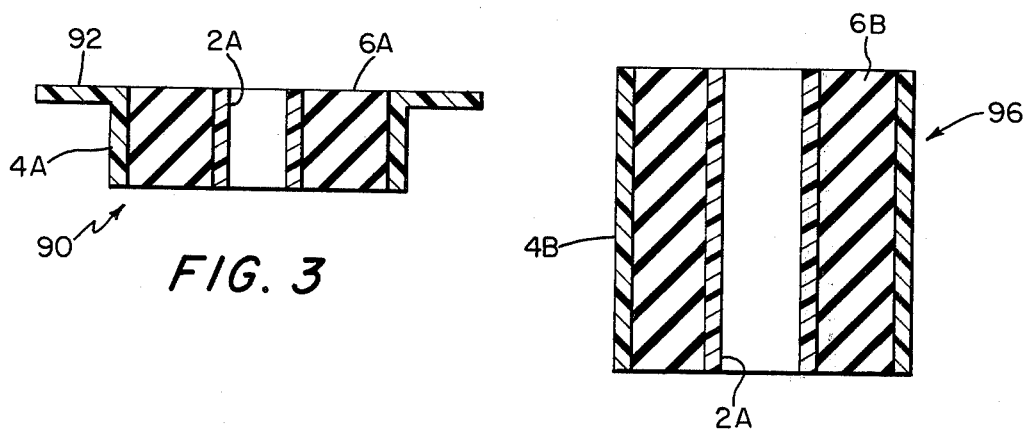
FIG. 3
FIG. 4

METHOD OF COINJECTION MOLDING OF THERMOPLASTIC AND THERMOPLASTIC ELASTOMER

This is a continuation-in-part of our copending U.S. application Ser. No. 086,733, filed Oct. 22, 1979, now abandoned, for Vibration Isolators and Manufacture Thereof by Co-Injection Molding.

This invention pertains to improvements in vibration isolator technology and more particularly to a new form of vibration isolators and a new method of manufacturing such device.

PRIOR ART

A number of different types of vibration isolators are known. This invention is concerned primarily with plate-type and tubular type isolators, so called because the former type has a small length to diameter ratio and thus is relatively flat while the latter type has a relatively large length to diameter ratio. Prior to this invention such isolators have usually consisted of inner and outer metal parts and a molded elastomeric part extending between and bonded to the two metal parts. While this well known form of construction has permitted the manufacture of isolators in different sizes and load ranges, the manufacturing process entails a number of steps which add to the cost of the product and must be carefully carried out for the sake of product reliability. Among these steps are the important ones of cleaning the metal components, applying a bond conditioner or adhesive to the metal parts so that they will bond to the elastomeric part, and then loading the components into the mold for fabrication of the elastomeric part. The molded product also must be heated to effect and complete vulcanization of the elastomer. Thirdly a shear bond strength of about 400 to 500 psi is desirable in order to prevent separation of the elastomer from the metal parts and permit the isolator to satisfy commercial requirements and withstand prolonged use. This level of shear bond strength can only be achieved by proper design and strict compliance with manufacturing requirements, including proper control of molding temperatures and pressures.

SUMMARY OF THE INVENTION

The primary object of this invention is to provide a new and improved method of manufacturing plate-type and tubular-type vibration/shock isolators and new and improved forms of such isolators.

A second important object is to make possible the manufacture of isolators of the type described in a manner which avoids or substantially reduces the problems and limitations of the prior manufacturing method.

Still another object is to provide a method of manufacturing vibration and shock isolation isolators which is substantially faster and cheaper than methods of like purpose already employed in the art.

These objects are achieved by making the vibration and shock isolators of two different synthetic plastics using a co-injection molding process. One plastic is a rigid thermoplastic material; the other is a thermoplastic elastomer. The latter is injected after the rigid thermoplastic material. This order of injection is initiated in order to achieve proper bonding of the two materials.

Other features and many of the attendant advantages of this invention are described in detail or made obvious by the following detailed description of preferred and alternative embodiments of the invention and the accompanying drawings wherein:

FIG. 1 is a sectional view in side elevation of a plate type vibration isolator constituting a preferred embodiment of the invention;

FIGS. 3 and 4 are similar views of two other embodiments of the invention.

Figure 2A:
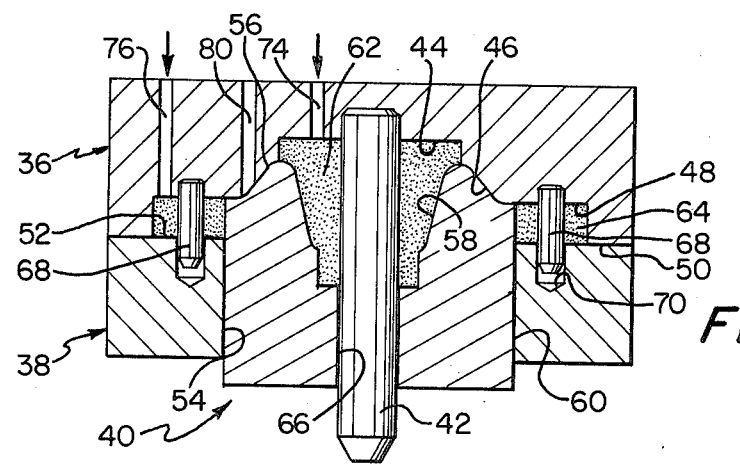
FIGS. 2A–2C are sectional views illustrating different positions of an injection mold assembly for use in making the isolator of FIG. 1.

Referring now to FIG. 1, the article which is illustrated is a plate-type vibration isolator which consists of inner and outer parts 2 and 4 and an intermediate part 6. Both of the inner and outer parts are made of a substantially rigid thermoplastic material, while the intermediate part is made of a thermoplastic elastomer. As used herein the term "substantially rigid thermoplastic material" means a solid substantially rigid material which has the property of fusing (softening to the point of becoming a liquid) when heated to a suitable temperature and of hardening and becoming a solid and substantially rigid again when cooled to room temperature, i.e., 70° F., and the term "thermoplastic elastomer" means a solid material which has the property of fusing when heated to a suitable temperature and of hardening and becoming a solid which is resilient and behaves as an elastomer when cooled to room temperature. These thermoplastic materials may consist of a single thermoplastic polymer substance or a mixture of such substances, with or without additives such as colorants, plasticizers, anti-oxidants, stabilizers, and other functional ingredients that suitably modify one or more of the physical properties of the thermoplastic substance(s).

A further requirement of this invention is that the parts 2, 4 and 6 be formed by injection molding. Hence the substantially rigid thermoplastic material and the thermoplastic elastomer must be made from molding materials which are capable of being injection molded. The molding materials may consist of or be made up in the majority of one or more polymers and/or one or more copolymers. Additionally the material used to manufacture the parts 2 and 4 and the material used to form the part 6 should be compatible in the sense that they are capable of bonding to one another by fusion, i.e., by contacting the materials when at least one is in a fluid state and then cooling the fluid state material until it has solidified and formed a bond with the other material. While the parts 2 and 4 could be made of different mutually compatible materials which melt and solidify at the same or nearly the same temperatures, it is preferred that they be made of the same material. Preferably the parts 2 and 4 have a flexural modulus in excess of 400,000 psi while the part 6 is a soft low modulus thermoplastic elastomer having a Shore A scale durometer value of between 35 and 85. By way of example but not limitation, the parts 2 and 4 are made of polystyrene having a flexural modulus of about 465,000 psi and the part 6 is made of a butadiene styrene compound having a Shore A scale durometer value of 55.

The parts 2, 4 and 6 are shown in the drawings as having sharply defined boundaries since, as explained below in greater detail, the interfaces between those parts are substantially free of any intermixing or interdiffusing of the thermoplastic materials.

Still referring to FIG. 1, the inner part 2 has flat annular top and bottom surfaces 8 and 10, a cylindrical inner surface 12 defining an axial bore 17 and an outer boundary represented as a surface of revolution comprising cylindrical end sections 16 and 18 and a double-curved intermediate section 20. The outer part 4 serves as a flange for the isolator unit and has a cylindrical outer surface 22 and an inner boundary 24 represented as a cylindrical surface, and mutually parallel top and bottom surfaces 26 and 28 which are parallel to the corresponding surfaces of inner part 2 and extend at right angles to the axis of the inner part. Outer part 4 also has a plurality of mounting holes 5. The intermediate part 6 has inner and outer sections 30 and 32 that are bonded respectively to inner part 2 at its boundary section 18 and the part 4 at its inner boundary 24, plus a convoluted intermediate section 34 that extends between inner part 2 and outer part 4. Intermediate section 34 is bonded to the inner part 2 at the boundary section 20. Intermediate section 34 acts as a spring to resiliently locate inner part 2 with respect to outer part 4.

When the device of FIG. 1 is made by the molding method hereinafter described, substantially no diffusion or mixing of one material into or with the other material will occur. Additionally no or only minor distortions of one material by the other will occur along the boundary regions. It has been determined by inspecting cross-sections of isolators like those of FIG. 1 made according to this invention with a scanning electron microscope to a magnification of 20,000, that the boundaries between the butadiene styrene thermoplastic elastomer and the polystyrene parts have an interface region (the region of diffusion or intermixing of one material into or with the other) with a thickness in the order of only $1.0 \times 10^{-6}$ inch. Nevertheless the bond between the elastomer and non-elastomer parts is sufficiently strong for the device to perform satisfactorily as an isolator.

Figure 2B:
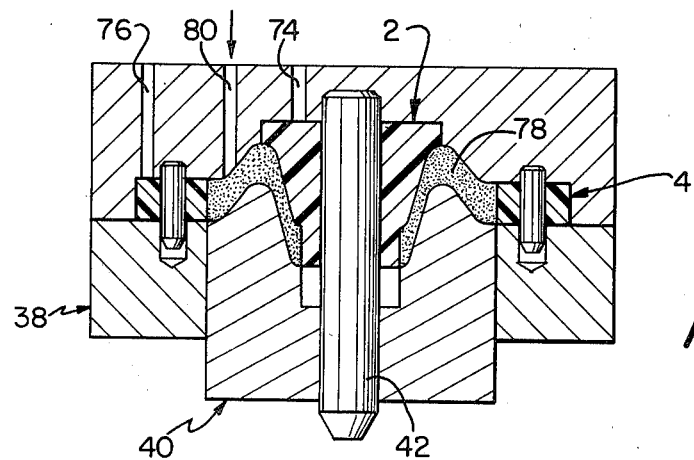
Figure 2C:
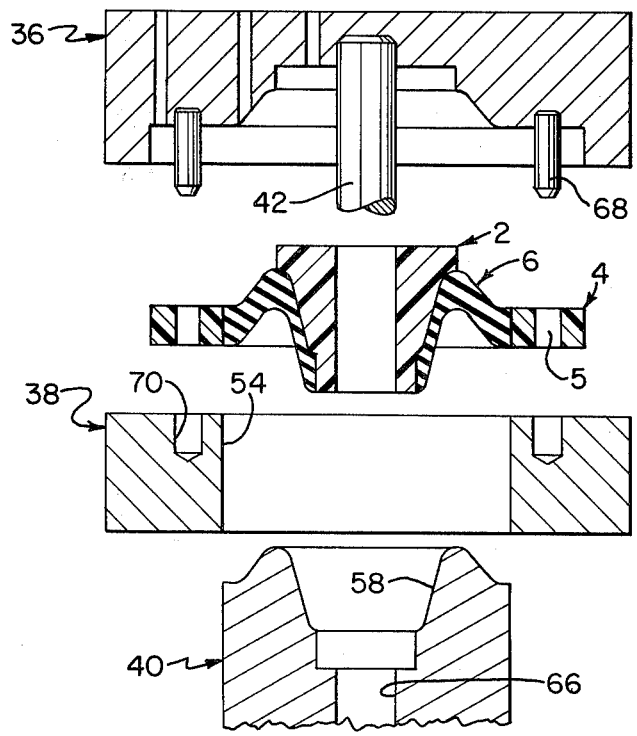

Referring now to FIGS. 2A–2C, the device of FIG. 1 is produced in accordance with a preferred mode of practicing the invention by means of a coinjection mold that essentially comprises three relatively movable mold members 36, 38 and 40 and a center part or core 42 attached to mold member 36. As seen in FIG. 2A, mold member 36 has a contoured inner end surface which comprises four distinct portions 44, 46, 48 and 50, while mold member 38 has a flat inner end surface 52 and a cylindrical inner surface 54. Mold member 40 has a contoured inner end surface comprising sections 56 and 58 and a cylindrical outer surface 60 that makes a close sliding fit with surface 54. The mold members are arranged so that when the mold members are in closed position, surfaces 50 and 52 will mate with one another while surfaces 44 and 58 and post 42 will form a first cavity 62 and surfaces 48, 52 and the upper portion of surface 60 will form a second cavity 64. Mold member 40 has a center hole 66 in which center post 42 makes a close sliding fit. A plurality of pins 68 secured in mold member 36 make close sliding fits in holes 70 in mold member 38. Pins 68 serve as cores for forming the mounting holes 5. Mold members 36, 38 and 40 are adapted (by conventional means not shown but known to persons skilled in the art of injection molding) to move relative to one another along the axis of post 42, so that as described hereinafter mold members 38 and 40 are movable separately and selectively to different positions along that axis relative to mold member 36.

The vibration isolator shown in FIG. 1 is manufactured using the mold assembly of FIGS. 2A–2C according to the following method. First the mold members 36, 38 and 40 are placed in the totally closed position shown in FIG. 2A (the first injection position) and a suitable liquid thermoplastic injection molding material capable of solidifying into a rigid or near rigid solid (e.g. polystyrene) is injected into mold cavities 62 and 64 via injection ports 74 and 76 so as to form the isolator parts 2 and 4. Then mold member 40 is retracted until the outer edge of its surface 56 is flush with surface 52, so as to form a third cavity 78 as shown in FIG. 2B (the second injection position). Next a suitable liquid thermoplastic injection molding material capable of solidifying into a solid material with the properties of an elastomer (e.g. butadiene styrene) is injected into cavity 78 via one or more injection ports 80 so as to form the isolator part 6. This injection step is conducted after the material injected into the cavities 62 and 64 has solidified or become viscous enough so that it will not be displaced or distended by the material injected via port 80, yet is soft enough to bond to the elastomer material. Thus the second injection step is carried out while the material in cavities 62 and 64 is still hot but after it sets up as a solid. By appropriate choice of materials, it is possible for the cavity 78 to be filled within as short a time as one to three seconds after the cavities 62 and 64 have been filled and still achieve a satisfactory bond between the elastomer and non-elastomer parts. Finally, after the part 6 has set up as a solid in cavity 78, the mold members 38 and 40 are separated from mold member 36 as shown in FIG. 2C, whereupon the finished isolator may be removed from the mold and set aside to cool. Thereafter the mold members are returned to the position shown in FIG. 2A for the next molding cycle.

In the preferred mode of practicing the invention, the isolator parts 2 and 4 are molded of polystyrene which solidifies so as to have a flexural modulus of about 465,000 psi and the isolator part 6 is made of a butadiene styrene copolymer which solidifies so as to have a durometer measured on the Shore A scale of between 35 and 85 (depending upon the spring rate desired for the isolator), with the polystyrene preferably being the material sold by Shell under the trade name Shell DP-203 and the butadiene styrene being the material sold by Shell under the trade name Kraton 3000 Series thermoplastic rubber. Adequate temperatures and pressures are determined by the characteristics of the materials used, i.e., the foregoing polystyrene molding material is injected with a pressure of approximately 5000 psi and a temperature of about 390° F.; the foregoing butadiene styrene molding material is injected into cavity 78 at a pressure of approximately 6000 psi and a temperature of about 390° F. The latter injection step should occur about 1 to 3 seconds after terminating insection of the polystyrene molding compound into cavities 62 and 64. The injection materials are maintained at a temperature of about 390° F. during the two injection steps, but the mold is maintained at a temperature of about 100° to about 150° F. during the molding process. The mold is opened and the finished part is removed about 1 minute after the second injection step is completed. The mold part is then set aside and allowed to cool to room temperature before being labelled, tested and packaged. The finished products exhibit a shear bond strength between the part 6 and parts 2 and 4 of at least 400–500 psi and usually between about 600–800 psi, in comparison with the typical bond strength of about 500 psi between the metal and elastomer parts of conventional metal/elastomer isolators.

It is to be noted that injecting the elastomer material after the rigid material has been injected is critical. It has been determined that if the elastomer is injected at the same time as or before the rigid material, a satisfactory isolator product cannot be achieved since the elastomer is incapable of withstanding deformation in cavity 78 under the pressures required to be used in injecting the rigid plastic material into cavities 62 and 64. This is true even if the elastomer has fully cured before the non-elastomer material is injected. Only if the elastomer injection is delayed until after the rigid plastic material has set up sufficiently to withstand deformation under the pressures required to inject the elastomeric material is it possible to achieve a strong enough bond between the elastomer and non-elastomer parts and also have the isolator parts conform exactly to the shape of the three mold cavities.

A further distinct advantage of the invention is that the spring rate of the isolator may be changed by modifying the composition and hence the durometer of the material used to form the intermediate part 6. Thus, for example, the Kraton molding material is available from Shell as Kraton 3226 for 35 durometer A scale, Kraton 3202 for 55 durometer A scale, and Kraton 3204 for 85 durometer A scale. Other durometer values can be achieved by suitably blending any two or all three of the foregoing Kraton materials or by the addition or substitution of other thermoplastic elastomers. The stiffness of the parts 2 and 4 may be modified by mixing some of the elastomer molding material with the polystyrene molding material. In this connection it is to be appreciated that the parts 2 and 4 need not be absolutely rigid; for some isolator applications it may suffice or be desirable that those parts be merely stiff, i.e. semi-rigid.

A further advantageous feature of the foregoing preferred method of practicing the invention is that the molding materials are injected coaxially rather than by the biaxial method disclosed by I. Martin Spier in his U.S. Pat. No. 3,950,483. It has been found that molding by coaxial injection is simpler to execute and thus leads to a more reliable product.

Another advantage of the invention is that isolators of various shapes, sizes and vibration-isolating characteristics may be formed. Thus, for example, the shape and/or size of the intermediate part 6 may be altered merely by modifying the several mold parts. Further by way of example, by appropriately molding the mold assembly it is possible to form a flat isolator 90 (FIG. 3) consisting of a cylindrical inner part 2A, a cylindrical outer part 4A with a flat circular flange 92, and a cylindrical intermediate part 6A having flat end surfaces. Also by way of example, the invention is adaptable to providing an axially-elongate isolator 96 (FIG. 4) where the three parts 2B, 4B and 6B are all cylindrical and the length of part 6B substantially exceeds its inner radius as well as its outer radius. The two alternative forms of isolators have different vibration isolation characteristics than the unit of FIG. 1 even where made of the same materials as the latter.

Still another advantage of the invention is that it may be practiced with a variety of thermoplastic injection molding materials. Thus, the injection molding thermoplastic elastomer material constituting the part 6 could comprise or consist of a material other than butadiene styrene known to persons skilled in the art. In this connection it is to be noted that the term "thermoplastic elastomer" is a term already known to persons skilled in the art, as evidenced by Tobolsky et al, Polymer Science and Materials, page 277, Wiley-Interscience (1971); and that a variety of such materials exist as disclosed by B. A. Walker, Handbook of Thermoplastic Elastomers (1979).

Further, by way of example but not limitation, the stiff thermoplastic parts 2 and 4 may be made of a material other than polystyrene, e.g., acrylonitrile-butadiene styrene (ABS), poly methyl methacrylate (e.g. Plexiglas), a polypropylene polymer and other materials obvious to persons skilled in the art, as taught for example, by U.S. Pat. Nos. 3,941,859, 3,962,154, and 4,006,116. The exact choice of materials used will depend upon the characteristics desired and the compatability of the non-elastomer and elastomer materials with respect to bonding to one another.

Following are a number of combinations of compatible non-elastomer and elastomer materials which may be used to form the parts 2, 4 and 6 respectively:

(A) parts 2, 4-Shell DP 203 Polystyrene (density—1.04 gm/cm$^3$ and tensile strength—471 kg/cm$^2$) with carbon black filler, and part 6—(1) Phillips Solprene 475P Radial SBS block co-polymer of polybutadiene and polystyrene (Shore A hardness—90), or (2) Shell Kraton 1101 linear block co-polymer of styrene, butadiene and styrene (SBS) using carbon black as filler, or (3) Shell Kraton 3226 linear block SBS co-polymer using a clay filler;

(B) parts 2, 4—Kodak Tenite P2635-72AA, believed to be a polypropylene polyallomer containing 30% glass fibers (density—1.12 gm/cc, tensile strength—1357 kg/cm$^2$, and part 6—(1) Union Carbide Bakelite Ethylene co-polymer DQDA-3269, Natural 7 Ethylene -propylene co-polymer, or (2) Exxon Vistaflex Thermoplastic Rubber, EPDM Terpolymer, or (3) 1,2 Syndiotactic Cross-linkable polybutadiene (density 0.90 gm/cm$^3$, tensile strength—102 kg/cm$^2$).

Other modifications and advantages of the invention will be obvious to persons skilled in the art.

What is claimed is:

1. A method of producing a vibration isolator having (a) first and second concentric and mutually spaced parts molded of a substantially rigid thermoplastic material, and (b) a third part molded of a thermoplastic elastomer material and extending between and bonded to said first and second parts, said method comprising:
   (a) injection molding said first and second parts simultaneously in first and second mold cavities respectively; and
   (b) injection molding said third part between said first and second parts so that said thermoplastic elastomer material of which said third part is molded will fusion bond directly to the thermoplastic material of which said first and second parts are made.

2. A method according to claim 1 wherein said first and second parts are made of polystyrene.

3. A method according to claim 1 wherein said third part is made of a copolymer of styrene and butadiene.

4. The method of claim 1 further comprising the step of opening the mold so as to form a third mold cavity, disposed between said first and second parts and wherein said third part is molded within said third cavity.

5. A method according to claim 1 or 4 wherein said third part is molded after said thermoplastic polymer material has set up but before it has reached its maximum hardness.

6. The method of claim 4 in which the injection molding of said third part occurs less than three seconds after the injection molding of said first and second parts.

7. A method of molding a device having a first part molded of a substantially rigid thermoplastic material, and a second part molded of a thermoplastic elastomer material fusion bonded to said first part, said method comprising the following steps:
(a) closing a movable mold, to a first position in which a first cavity is formed;
(b) injection molding said first part in said first mold cavity while said mold is in said first position;
(c) opening the mold to a second position in which a second cavity is formed adjacent and in communication with the first cavity;
(d) injection molding said second part in said second mold cavity while said mold is in said second position, so that said thermoplastic elastomer material of which said second part is molded will fusion bond directly to the thermoplastic material of which said first part is made; and
(e) opening the mold to a third position in which the parts can be removed.

8. A method of claim 7 wherein the mold comprises two opposing mold members between which said first and second cavities are formed, said mold members being movable toward or away from one another, and wherein the opening steps each comprise separating said mold members from one another.

9. A method according to claim 7 wherein said opening of the mold to a second position is performed after said thermoplastic, non-elastomer material has set up but before it has reached its maximum hardness.

10. A method of molding a device having a first part molded of substantially rigid thermoplastic material, and a second part molded of thermoplastic elastomer material bonded to said first part, said mold including a first mold member and a second mold member, said first mold member being movably disposed relative to the second mold member, said method comprising the following steps:
(a). forming a first mold cavity between the mold members;
(b). after step (a), injection molding the thermoplastic material of said first part in said first mold cavity;
(c). after step (b), forming a second mold cavity defind between the mold and the thermoplastic material in said first mold cavity; and
(d). after step (c), injection molding the thermoplastic elastomer of said second part in said second mold cavity thereby fusion bonding the thermoplastic elastomer material of said second part directly to the thermoplastic material of said first part.

11. The method of claim 10 wherein the forming of the first mold cavity includes the step of moving the first mold member to a first position, and the forming of the second mold cavity includes the step of moving the first mold member to a second position; and further comprising, after the thermo-elastomer of said second part has set-up, moving the first mold member to a third position in which the parts are accessible for removal from the mold.

12. The method of claim 10 wherein the forming of the second mold cavity is performed after the thermoplastic material in the first mold cavity has set-up.

13. The method of claim 12 wherein the injection molding of the thermoplastic elastomer in the second mold is performed before the thermoplastic material in the first mold cavity has reached maximum hardness.

14. The method of claim 10 further comprising the initial step of closing the mold by moving the first mold member towards the second mold member, and wherein the second mold cavity is formed by retracting the first mold member from the second mold member, with said second mold cavity defined by said first and second mold members and said thermoplastic material in the first cavity.

* * * * *